US005511840A

United States Patent [19]

Allison et al.

[11] Patent Number: 5,511,840

[45] Date of Patent: Apr. 30, 1996

[54] STATIC DISSIPATIVE COUPLING OF AN ARTICLE-PICKUP TIP TO A WAND

[75] Inventors: Quincy D. Allison, Boulder Creek; Howard W. Hendricsen, Los Altos, both of Calif.

[73] Assignee: H-Square Corporation, Sunnyvale, Calif.

[21] Appl. No.: 197,210

[22] Filed: Feb. 16, 1994

[51] Int. Cl.[6] ................................ B25J 15/06; H05F 3/04

[52] U.S. Cl. ............................................ 294/64.1; 361/220

[58] Field of Search .................................. 294/64.1–64.3; 29/740, 743; 269/21; 271/90, 108, 208; 361/212, 215, 220, 222

[56] References Cited

U.S. PATENT DOCUMENTS

| | | | |
|---|---|---|---|
| 3,711,742 | 1/1973 | Pinkham | 361/212 |
| 3,982,157 | 9/1976 | Azuma et al. | 361/215 |
| 4,744,594 | 5/1988 | Poli et al. | 294/64.1 |
| 4,866,565 | 9/1989 | Wray | 361/215 |
| 5,106,139 | 4/1992 | Palmer et al. | 294/64.1 |
| 5,118,153 | 6/1992 | Allison et al. | 294/64.1 |
| 5,169,192 | 12/1992 | Allison et al. | 294/64.1 |
| 5,217,273 | 6/1993 | Hendricsen et al. | 294/64.1 |
| 5,280,979 | 1/1994 | Poli et al. | 294/64.1 |

*Primary Examiner*—Johnny D. Cherry
*Attorney, Agent, or Firm*—Schneck & McHugh

[57] ABSTRACT

A vacuum-actuated article handling tool includes an electrically conductive wand body that is selectively coupled to a pickup tip by a static dissipative connecting assembly. The connecting assembly preferably includes a rigid, electrically insulative cap. The cap is rigid in order to securely hold the tip and is electrically insulative in order to prevent direct contact of the conductive tip to the conductive wand body. The connecting assembly includes a resistive member that is preferably flexible. The flexibility allows the resistive member to conform to the shape and position of the tip, so that a repeatable tip-to-wand electrical connection is made. The resistive member is formed of a material that achieves a desired current-limiting resistive path, thereby providing protection for handled articles that are susceptible to damage by electrostatic discharge.

17 Claims, 2 Drawing Sheets

STATIC DISSIPATIVE COUPLING OF AN ARTICLE-PICKUP TIP TO A WAND

TECHNICAL FIELD

The present invention relates generally to tools for handling workpieces such as electronic devices and more particularly to vacuum-actuated devices.

BACKGROUND ART

A vacuum-actuated tool for handling electronic workpieces is described in U.S. Pat. No. 5,169,192 to Allison et al. The tool includes a hand-held wand and a replaceable pickup tip that is press fit to the wand. The tip includes a vacuum pocket that is brought into contact with the electronic workpiece, allowing a workpiece to be carried under vacuum pressure. Typically, a wand includes a valve mechanism for selectively blocking an air evacuation path through the wand. Blocking the air evacuation path releases the electronic workpiece.

A concern in the handling of an electronic article, such as a semiconductor wafer, an integrated circuit chip or an integrated circuit package, is the damage that may be caused by electrostatic discharge (ESD). Even under careful handling procedures, a person or device can develop a high static voltage. Discharge of the voltage through an integrated circuit will generate electrical currents in excess of currents tolerable by the circuit. An ESD pulse can cause gate oxide breakdown or short circuiting of adjacent conductive signal traces within a circuit.

Structures for reducing the potential of circuit damage caused by ESD are known. The wand may be formed of an electrically conductive material, while the pickup tip includes forward and rearward conductive regions that are joined by a resistor. In one embodiment of this approach, the resistor is embedded into the pickup tip, so that the tip has the appearance of a conventional pickup tip. Typically, the wand is connected to ground potential. The embedded resistor provides an electrical path between the conductive wand and the forward portion of the tip. The resistive path limits the current between the wand and the electronic workpiece to be handled. However, an embedded resistor adds to the manufacturing complexity and cost of a pickup tip. The additional cost to an end-user is significant, since a number of tips are used during the life of the wand. Moreover, there may be a practical limit to the resistance of the embedded resistor, e.g., $10^6$ ohms.

Another option is to form the wand and the pickup tips of conductive materials and to connect the wand to ground potential. A wire may be connected from the wand to a ground point. A load resistor is wired in series to the electrical ground, thereby limiting the current of a static discharge. A problem with such a ground circuit is that a voltage pulse between a person handling the wand and the electronic workpiece being handled may cause circuit damage before current flow through the resistive ground circuit is able to dissipate the charge.

An attempt has been made to form a pickup tip of a resistive material. Because such a tip is a unitary structure, the manufacturing complexity and cost is less than that of a tip having an embedded resistor. While the resistive tip was found to work well for initial applications of ESD pulses, the resistance of the tip was reduced upon encountering an ESD pulse. Thus, the tips had to be replaced more often than conventional pickup tips.

It is an object of the present invention to provide an article-handling tool which achieves a more reliable controlled dissipation of static electricity.

SUMMARY OF THE INVENTION

The above object has been met by a vacuum-actuated tool in which the structure for coupling a replaceable tip to the body, or "wand," of the tool establishes a current-limiting electrical path. In a preferred embodiment, both the wand and the pickup tip are electrically conductive. The wand may be connected to ground potential, reducing the risk of collecting a static charge that could cause damage to an article upon occurrence of an ESD in the wand-to-tip direction. With regard to an article-to-wand ESD, the conductive members provide a means for discharging the electrostatic force, but a resistive coupling of the pickup tip to the wand limits the current to a level that can be tolerated by articles to be handled by the vacuum-actuated tool.

In addition to the electrical path, there is an air evacuation path from the pickup tip to the wand. The pickup tip typically includes a contact region that is to be joined to an article to be handled, e.g., an integrated circuit chip or an integrated circuit package. The contact region is in fluid communication with a passageway in the wand. A vacuum source evacuates air from the passageway, providing vacuum pressure at the contact region of the pickup tip. Preferably, the wand includes a normally open or normally closed valving mechanism that selectively blocks the passageway from the vacuum source to the pickup tip, thereby releasing any article being manipulated at the contact region. The current-limiting structure that mechanically and electrically connects the pickup tip to the wand is positioned to leave the fluid communication uninhibited.

In the preferred embodiment, the coupling of the pickup tip to the wand is provided by at least one insulative member and at least one resistive member. The insulative member is rigid and is dimensioned to slidably receive the pickup tip. For example, a pickup tip may include a cylindrical stem having an axial bore. The stem is press fit into a rigid cap having an opening aligned with the bore through the stem to allow air flow from the axial bore to the wand. Because the cap is a rigid member, the tip is securely supported by the cap. The end portion of the cap prevents the electrically conductive tip from contacting the electrically conductive wand. In place of the end portion, the rigid member may have other features that prevent direct contact between the tip and the wand. For example, the rigid member may have a configuration to receive the tip in a slide-fit manner, but may include protrusions at an inner surface to prevent tip-to-wand contact.

The complement to the rigid, insulative member is a flexible, resistive member. The resistive member preferably has an annular configuration. The flexibility of the member permits the structure to conform to the shape of the pickup tip, ensuring a repeatable electrical connection with the tip. The inside diameter of the resistive member contacts the tip, while the outside diameter contacts the wand. The resistive member may be tubular to provide sufficient surface contact with the tip and with the wand. Alternatively, the desired surface contact can be achieved by providing one or more resistive O-rings. While not critical, the resistance from the tip to the wand is preferably in the range of $10^6$ through $10^{11}$ ohms.

An advantage of the present invention is that the resistive electrical path between the pickup tip and the wand provides dissipation of an electrostatic charge, but at a controlled rate. The series resistance limits the peak current, protecting electronic articles from damage that would otherwise result from excessive current flow. Often, ESD damage to an electronic article is the result of heat generated during the surge of current. The resistive coupling structure of the present invention limits the peak current and spreads the dissipation over a greater time period, so that thermal energy is less likely to cause damage.

Another advantage is that by grounding the conductive wand, the tool will not gain a charge that would otherwise attract particulate matter. Since particles reduce manufacturing yields when introduced into integrated circuit processing, the grounded wand potentially reduces yields.

Yet another advantage is that the resistance is introduced between the wand and the tip without incorporating the resistance into the tip itself. Thus, the replaceable tips are more easily manufactured and are less expensive to end-users.

BEST MODE FOR CARRYING OUT THE INVENTION

Figure 1:
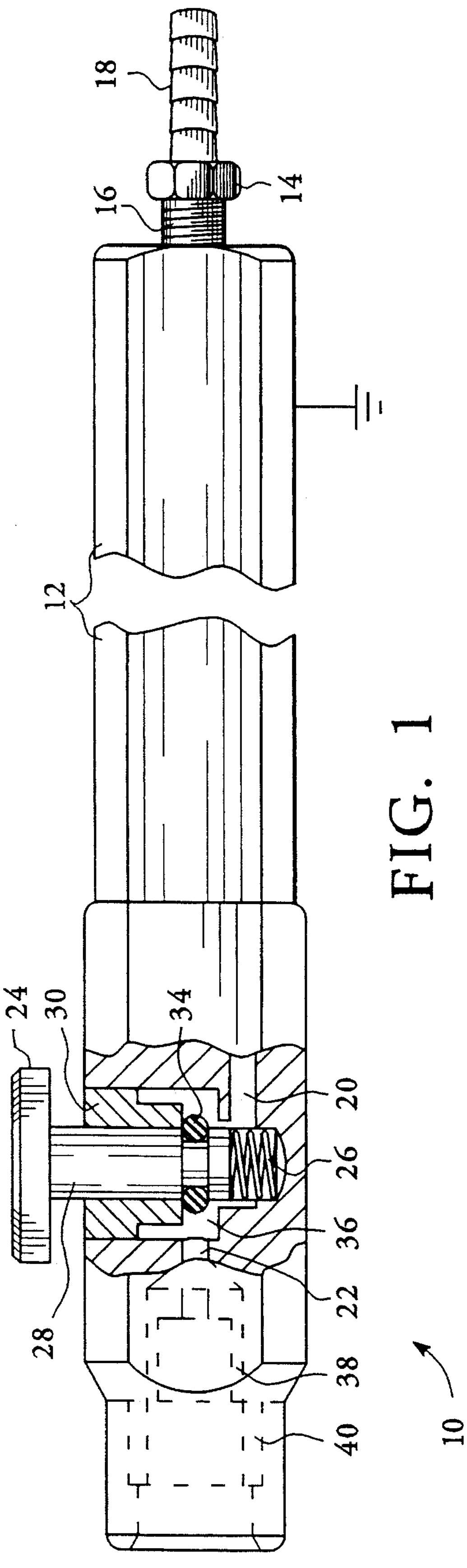
FIG. 1 is a side, partially sectional view of a vacuum-actuated wand in accordance with the invention.

With reference to FIG. 1, a vacuum-actuated wand 10 includes a body 12 configured for easy handling by a user. A fitting 14 includes external threads 16 that are received within an internally threaded bore of the body. Ridges 18 at the end of the fitting ensure an airtight seal when a vacuum hose is pressed over the end of the fitting having the ridges. A passageway through the fitting is in fluid communication with an air evacuation passageway 20 in the body 12. As an alternative to providing a connection to an external source of vacuum, the wand 10 may include a built-in vacuum source.

In FIG. 1, the air evacuation passageway 20 is in fluid communication with a forward passageway 22. However, the connection between the two passageways 20 and 22 is selectively blocked by depression of a valve button 24. A coil spring 26 biases the valve button into the open position shown in FIG. 1.

Extending from the valve button 24 is a valve stem 28 that is slidably fit within a plug 30. The valve stem includes a region having a reduced diameter to receive an O-ring 34. Upward movement of the valve stem is limited by contact of the O-ring with the plug 30. Downward movement is limited by contact of the O-ring with an internal surface of the wand body 12. In the raised position, any air within the forward passageway 22 is drawn rearwardly into a valve chamber 36 and then downwardly into a gap between the valve stem 28 and the wand body 12. The air is evacuated from a wand 10 via the passageway 20.

When the valve stem 28 is in a depressed position, the O-ring 34 seals the gap between the valve stem and the wand body, so that air cannot be drawn from the chamber 36 into the air evacuation passageway 20. In operation, a pickup tip is attached to the wand 10. With the valve stem 28 in the position shown in FIG. 1, vacuum pressure is applied to the pickup tip. The pickup tip is formed to apply the vacuum pressure to an article to be manipulated. Release of the article is effected by depressing the valve button 24 to a position in which the passageways 20 and 22 are no longer connected, thereby releasing the vacuum pressure. The type of valve is not important to the invention. A normally closed valve may be substituted for the normally open valve of FIG. 1. In fact, a valve is not necessary.

Particularly in the electronics industry, an article to be handled by the wand 10 may be damaged by a discharge of electrostatic energy. The wand body 12 may be formed of an electrically conductive material to provide an electrical path through the wand. If the pickup tip is also conductive, the electrical path extends to the article to be handled, so that ESD can be controlled by the tip-to-wand coupling to be described below.

The wand body 12 is preferably electrically grounded. The grounding functions to prevent collection of an electrostatic charge. A properly grounded wand body will not be a source of an ESD and will not attract particulate matter which would potentially damage articles to be handled, e.g., an integrated circuit. One means for connecting the wand body to ground potential is to attach a coil cord having a resistance in the static dissipative range to the fitting 14 on the wand body.

Figure 2:
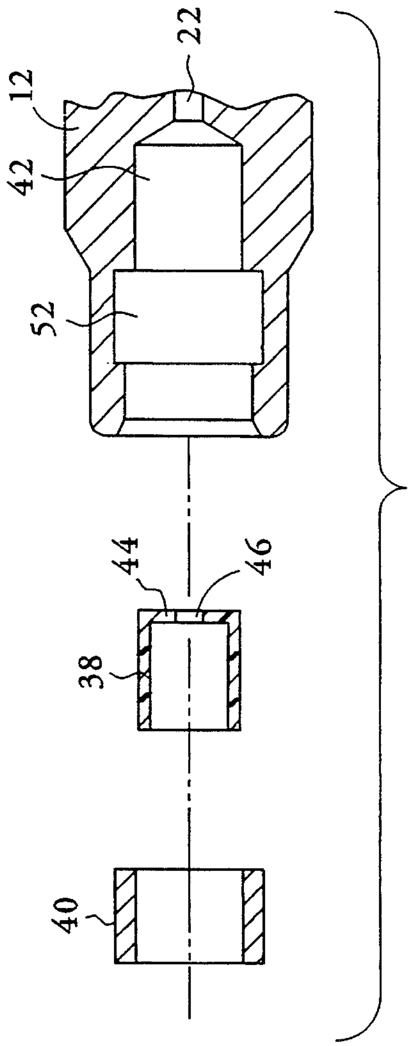
FIG. 2 is an exploded side sectional view of the wand of FIG. 1 and the structure for coupling a pickup tip to the wand.

Referring now to FIGS. 1 and 2, the coupling of a pickup tip to the wand body 12 is achieved by a rigid, electrically insulative cap 38 and a flexible, electrically resistive annular member 40. The insulative cap is fixed within a cylindrical chamber 42 of the wand body 12. While not critical, an acceptable material for forming the cap is polyetheretherketone (PEEK). In one embodiment, the cap has an inside diameter of 0.261 inch and an outside diameter of 0.315 inch. The length of the cap may be 0.3 inch. An inwardly extending portion 44 includes an axial bore 46 to permit passage of air to the forward passageway 22 of the wand body.

Figure 3:
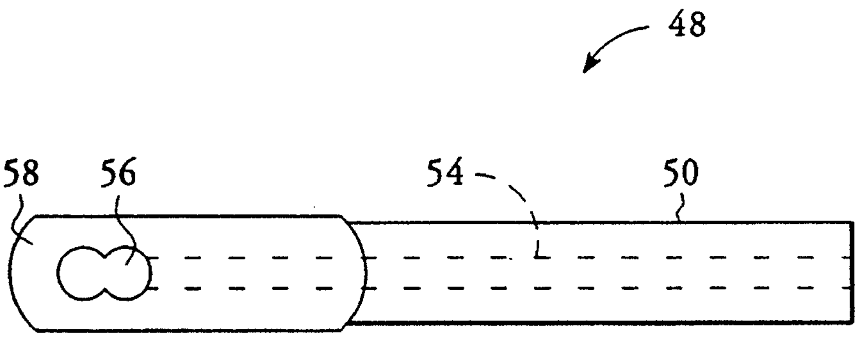
FIG. 3 is a top view of a pickup tip for connection to the wand of FIG. 1.

While the insulative cap 38 is shown as having a cylindrical configuration, this is not critical. Referring to FIGS. 1–3, a pickup tip 48 is typically press fit to a wand 10 at a stem 50 of the tip. If the stem is to be press fit to the wand, the insulative cap 38 should have a configuration and should be dimensioned to provide the desired connection. However, other means of attaching the tip 48 to the wand may be utilized. What is important is that the insulative cap prevents direct contact of the end of the tip with the wand body. Direct contact is undesirable since it would establish a low resistance connection between the conductive tip and the conductive wand body. An acceptable material for forming the wand body is carbon filled polyvinylene fluoride (PVDF), in which case the wand handle could have a resistance in the range of 100 to 5K ohms.

The resistive annular member 40 provides the current-limiting structure to protect articles susceptible to damage by electrostatic discharge. Because the annular member is flexible, it is able to conform to the position of the pickup tip 48. Thus, a repeatable electrical connection is made between the wand body 12 and various pickup tips to be used in connection with the wand body. The resistive annular member 40 fits within a second cylindrical chamber 52 of the wand body. The annular member is deformed during insertion into the wand body and can be periodically replaced. Some resistive materials exhibit lower resistances after an ESD pulse has been conducted through the material. If such a material is used in forming the annular member 40, the ability to easily replace the annular member plays an important role in the structure of FIGS. 1–2.

By "resistive" what is meant is that the annular member 40 has a resistance that is at least one order of magnitude greater than the resistance of the wand body 12. A resistance within the range of $10^6$ to $10^{11}$ ohms is preferred, with a range of $10^8$ to $10^{10}$ being considered better. An acceptable material for forming the resistive annular member is a polyvinylchloride material sold by Norton Co. under the trademark TYGON. The length of the annular member may be 0.27 inch. The outside diameter may be 0.375 inch, and the inside diameter may be 0.25 inch. Another acceptable material is believed to be a thermoplastic polyurethane sold by BFGoodrich Co. under the trademark ESTANE X-4612. The surface resistivity of this material is $1.1 \times 10^{11}$ ohms/sq and the volume resistivity is $2.0 \times 10^{10}$ ohms/cm.

The resistive annular member 40 provides the desired electrical connection of the tip 48 to the wand body 12 and also contributes to the mechanical support. The rigid insulative cap 38 securely couples the tip to the wand body, but prevents direct contact between the tip and the body. The inwardly extending portion 44 limits movement of the stem 50 of the tip 48 into the body, but the axial bore 46 through the insulative cap provides the necessary fluid communication. The pickup tip 48 has an axial passageway 54 to an opening 56 through a contact region 58 against which an electronic article or other workpiece is to make contact.

Figure 4:
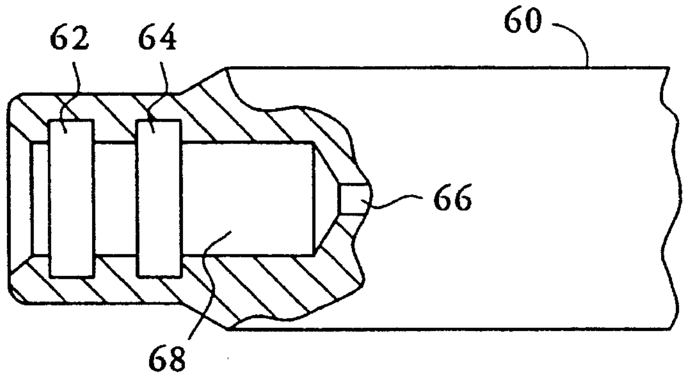
FIG. 4 is a partial sectional view of a second embodiment of a vacuum-actuated wand in accordance with the present invention.
Figure 5:
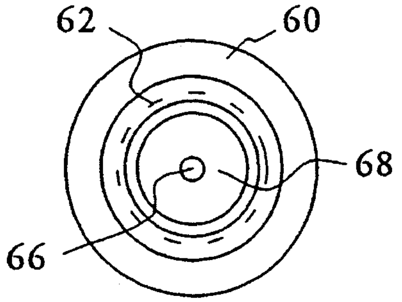
FIG. 5 is a front end view of the wand of FIG. 4.

In another embodiment, the sleeve-like resistive member is replaced with one or more resistive O-rings. Referring now to FIGS. 4 and 5, a wand body 60 includes a pair of large diameter regions 62 and 64 to receive a pair of resistive O-rings. Manufacture of O-rings is typically less problematic than the fabrication of resistive sleeves. The O-rings provide support for a pickup tip, but in most applications, the support is not sufficient. Therefore, a rigid cap is used. While it may be desirable to form the rigid cap of a resistive material, an acceptable material may not be available. However, if adequate materials are available, the electrical and mechanical roles of the cap and the O-rings may be reversed.

The wand body 60 includes a forward passageway 66 for the evacuation of air from a region 68 into which the rigid cap is to be fixed. Thus, the operation is identical to the operation of the wand 10 described above with reference to FIG. 1.

While the invention has been described and illustrated as being configured to accept a pickup tip 48 having a stem 50 as shown in FIG. 3, this is not critical. Pickup tips having end cups or having other structures for securely holding electronic workpieces or other articles may be used if adaptations are made to the coupling structure.

We claim:

1. A vacuum-actuated article handling tool comprising:

an electrically conductive body having an air evacuation path; and a static dissipative means connected to said body for releasably connecting to an article-pickup tip, thereby selectively coupling said pickup tip to said body, said static dissipative means including a current-limiting member having a high resistivity to provide a high resistance electrical path from said body to said pickup tip.

2. The tool of claim 1 wherein said static dissipative means includes an electrically insulative member connected to said body to slidably receive said pickup tip.

3. The tool of claim 2 wherein said current-limiting member is flexible and said electrically insulative member is rigid.

4. The tool of claim 1 wherein said current-limiting member is an annular member having an outside surface in contact with said body and having an inside surface dimensioned to contact said pickup tip.

5. The tool of claim 1 wherein said current-limiting member has a resistivity in the range of $10^6$ to $10^{11}$ohms.

6. A vacuum-actuated tool for selectively attaching an article pickup tip comprising:

a wand having a flow path from a first opening at a tip region of said wand and having a valve positioned to selectively seal said flow path;

mechanical connect means attached to said wand for supporting said pickup tip to said wand at said tip region, said mechanical connect means being electrically insulative and being positioned to permit fluid communication between said wand and said pickup tip; and resistive connect means attached to said wand for electrically connecting said wand and said pickup tip, said resistive connect means having a high resistivity selected to establish a controlled static-dissipative path between said wand and said pickup tip.

7. The tool of claim 6 wherein said wand includes a fitting means for connecting said flow path to a source of vacuum pressure.

8. The tool of claim 6 wherein said mechanical connect means is a cap dimensioned to receive said pickup tip in a press fit fashion, said cap having an aperture in fluid communication with said first opening of said wand to permit evacuation of air from said pickup tip via said flow path of said wand.

9. The tool of claim 6 wherein said resistive connect means is an annulus formed of a highly resistive material.

10. The tool of claim 6 wherein electrical communication between said wand and said pickup tip is limited to current flow through said resistive connect means.

11. A vacuum-actuated tool comprising:

a pickup tip having an article-contact region and having a stem, said stem having a flow passageway in fluid communication with said article-contact region; and a wand having an annular resistive member and an insulative cap attached to said wand, said stem being fit into said insulative cap, said wand and said pickup tip being electrically conductive, electrical communication between said wand and said pickup tip being limited to an electrical path through said annular resistive member, said wand having an air evacuation path in fluid communication with said flow passageway of said pickup tip;

said annular resistive member further being removably attached to said wand to allow for periodic replacement of said annular resistive member.

12. The tool of claim 11 wherein said annular resistive member has a resistance in the range of $10^6$ to $10^{11}$ ohms.

13. The tool of claim 11 wherein said annular resistive member has a unitary structure.

14. The tool of claim 11 wherein said wand includes a valve and includes means for connecting said wand to a source of vacuum pressure.

15. The tool of claim 11 wherein said insulative cap is rigid and said annular resistive member is flexible.

16. The tool of claim 15 wherein said annular resistive member is an elastomer.

17. The tool of claim 11 wherein said wand is connected to ground.

* * * * *